(12) United States Patent
Zhang et al.

(10) Patent No.: US 11,405,850 B2
(45) Date of Patent: Aug. 2, 2022

(54) ACCESS CONTROL METHOD AND USER EQUIPMENT

(71) Applicants: SHARP KABUSHIKI KAISHA, Sakai (JP); FG Innovation Company Limited, Tuen Mun (HK)

(72) Inventors: Chongming Zhang, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 41 days.

(21) Appl. No.: 17/253,247

(22) PCT Filed: May 31, 2019

(86) PCT No.: PCT/CN2019/089521
§ 371 (c)(1),
(2) Date: Dec. 17, 2020

(87) PCT Pub. No.: WO2019/242484
PCT Pub. Date: Dec. 26, 2019

(65) Prior Publication Data
US 2021/0266818 A1 Aug. 26, 2021

(30) Foreign Application Priority Data
Jun. 19, 2018 (CN) .......................... 201810632763.6

(51) Int. Cl.
*H04W 4/00* (2018.01)
*H04W 48/02* (2009.01)
(Continued)

(52) U.S. Cl.
CPC ........... *H04W 48/02* (2013.01); *H04W 36/08* (2013.01); *H04W 68/005* (2013.01); *H04W 76/19* (2018.02)

(58) Field of Classification Search
CPC ... H04W 48/02; H04W 36/08; H04W 68/005; H04W 76/19; H04W 68/00; H04W 48/16; H04W 76/27; H04W 74/002; H04W 76/18
(Continued)

(56) References Cited

U.S. PATENT DOCUMENTS

2021/0092668 A1* 3/2021 Zaus ....................... H04W 8/02

OTHER PUBLICATIONS

3GPP TS 36.331 V15.1.0 (Mar. 2018) 3rd Generation Partnership Project; Technical Specification Group Radio Access Network; Evolved Universal Terrestrial Radio Access (E-UTRA); Radio Resource Control (RRC); Protocol specification (Release 15).
(Continued)

*Primary Examiner* — Marcos Batista
(74) *Attorney, Agent, or Firm* — ScienBiziP, P.C.

(57) ABSTRACT

The present invention provides an access control method in user equipment and user equipment. The present invention is capable of avoiding meaningless connection requests of RNAU, so as to improve the utilization efficiency of communication resources. The access control method in user equipment includes: if a result of access control check indicates that access is barred, then starting an access barring timer; and if it is considered that the access barring timer is in a non-running state, then determining, according to at least one of conditions, whether to trigger RAN Notification Area Updating (RNAU), where the conditions are as follows: whether a current connected state of the UE is an inactive state; whether an RNAU timer started when the UE enters the inactive state is in an running state; whether a cell in which the UE currently resides belongs to a RAN Notification Area (RNA).

4 Claims, 2 Drawing Sheets

(51) Int. Cl.
*H04W 76/19* (2018.01)
*H04W 36/08* (2009.01)
*H04W 68/00* (2009.01)

(58) Field of Classification Search
USPC .......................................... 370/329; 455/312
See application file for complete search history.

(56) References Cited

OTHER PUBLICATIONS

Intel, "Introduction of E-UTRA connected to 5GCN", R2-1809266 3GPP TSG-RAN2 Meeting #102, Busan, Korea, May 21-25, 2018.
NTT DOCOMO, "New SID Proposal: Study on New Radio Access Technology", RP-160671, 3GPP TSG RAN Meeting #71, Göteborg, Sweden, Mar. 7-10, 2016.

* cited by examiner

ACCESS CONTROL METHOD AND USER EQUIPMENT

TECHNICAL FIELD

The present invention relates to the technical field of wireless communications. More specifically, the present invention relates to an access control method in user equipment related to RAN notification area updating and a corresponding base station and user equipment.

BACKGROUND

With the rapid growth of mobile communications and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

For this purpose, at the Third Generation Partnership Project (3GPP) RAN #64 plenary session held in March 2016, a research topic on new 5G radio access technology was proposed (see non-patent literature: RP-160671 New SID Proposal: Study on New Radio Access Technology). In the description of the work project, the operating frequency band of future new communication RATs can be expanded to 100 GHz, which will satisfy at least service requirements for enhanced mobile broadband, the demand for communication between massive Internet of Things terminals, service requirements of high reliability requirements, and so on. The research work of the project is expected to end in 2018.

In an NR system, when UE enters an inactive state (hereinafter also referred to as INACTIVE), a timer T380 is started. When the T380 expires, the UE performs a RAN Notification Area Updating (RNAU) procedure. In addition, when the UE moves to a new cell not belonging to a RAN Notification Area (RNA) previously stored by the UE, the UE also performs RNAU. In order to perform RNAU, the UE initiates a procedure for resuming an RRC connection, and transmits an RRC connection resume request message to a network side to request to resume the RRC connection.

In addition, in the NR system, in order to control access by the UE, before initiating connection setup, the UE needs to perform access control check. A corresponding access category is assigned to each type of access request, and the UE performs corresponding access control check according to the access category corresponding to the access request.

There are two types of access control check results. One result is barring. In this case, the UE side starts an access barring timer (hereinafter also referred to as a barring timer) corresponding to the access category, and sets a certain time length. After the barring timer stops running, the UE can re-initiate access. The other result is no barring, that is, the UE can directly initiate access.

As mentioned above, the UE can trigger access once due to RNAU. During the access check procedure, if the check result is barring, then the UE needs to wait until the barring timer stops running, and then initiates access.

The barring timer stops running for the following two causes.

Cause 1: the barring timer runs until the barring timer expires.

Cause 2: when a certain event occurs, or when a condition is met, the barring timer is stopped. Generally, the UE enters a connected state, so that the barring timer is stopped; cell reselection occurs in the UE, so that the barring timer is stopped; or, an exception occurs on the UE side, and the UE side enters an idle state, so that the barring timer is stopped.

Whichever the cause is, when the barring timer is stopped, the UE can re-initiate a connection setup request. However, unlike a common procedure in which data transmission triggers a connection setup request, a cause of triggering of an RNAU procedure is time-based and regional. Therefore, once the barring timer is stopped, the UE re-initiates a connection request in order to perform RNAU, which may result in invalid RNAU. For example, when the UE enters the connected state, the barring timer is stopped, and it is meaningless to initiate a connection request of RNAU at this time. RNAU aims to inform a network of a current position of the UE, and the current position of the UE in the connected state is sensed by the network side. For another example, when cell reselection occurs in the UE, the barring timer is stopped, and a selected cell still belongs to the RNA held on the UE side. In this case, it is also meaningless to initiate the connection request of RNAU. This is because a cause of triggering of RNAU is as follows: the position of the UE has changed, so that a cell in which the UE resides does not belong to a stored RNA list. However, in this case, a cell in which the UE is located still belongs to the RNA stored on the UE side, that is, the position of the UE has not significantly changed, and it is meaningless to perform RNAU in this case. Therefore, the problem of how to avoid these meaningless RRC connection resume requests needs to be solved.

SUMMARY

The objective of the present invention is to provide an access control method in user equipment and user equipment capable of avoiding meaningless connection requests of RNAU so as to improve the utilization efficiency of communication resources.

According to a first aspect of the present invention, an access control method in User Equipment (UE) is provided, comprising: if a result of access control check indicates that access is barred, then starting an access barring timer; and if it is considered that the access barring timer is in a non-running state, then determining, according to at least one of conditions, whether to trigger RAN Notification Area Updating (RNAU), wherein the conditions are as follows: whether a current connected state of the UE is an inactive state; whether an RNAU timer started when the UE enters the inactive state is in an running state; whether a cell in which the UE currently resides belongs to a RAN Notification Area (RNA).

In the above access control method, optionally, if the current connected state of the UE is not the inactive state, then RNAU is not triggered.

In the above access control method, optionally, if the current connected state of the UE is the inactive state, and if the RNAU timer is not in the running state, then RNAU is triggered.

In the above access control method, optionally, if the current connected state of the UE is the inactive state, and if the cell in which the UE currently resides does not belong to the RNA, then RNAU is triggered.

In the above access control method, optionally, if the current connected state of the UE is the inactive state, if the RNAU timer is in the running state, and if the cell in which the UE currently resides does not belong to the RNA, then RNAU is triggered.

In the above access control method, optionally, if the current connected state of the UE is the inactive state, if the RNAU timer is in the running state, and if the cell in which the UE currently resides belongs to the RNA, then RNAU is not triggered.

In the above access control method, optionally, if the access barring timer expires, then the access barring timer stops running; or the access barring timer is stopped in any one of the following cases: cell reselection occurs in the UE; the UE enters the connected state; the UE enters an idle state or leaves the inactive state.

In the above access control method, optionally, if the access barring timer is in the non-running state, and if an access category corresponding to the access barring timer is selected by RRC or related to RNAU, then it is determined whether to trigger RNAU.

In the above access control method, optionally, it is determined, on the basis of an indication generated when the access barring timer stops running and indicating that access barring for the access category corresponding to the access barring timer is alleviated, whether to trigger RNAU.

According to a second aspect of the present invention, user equipment is provided, comprising: a processor; and a memory having instructions stored thereon, wherein the instructions, when run by the processor, execute the above access control method.

Effect of Invention

The access control method in user equipment and the user equipment according to the present invention can avoid meaningless connection requests of RNAU so as to improve the utilization efficiency of communication resources.

BRIEF DESCRIPTION OF THE DRAWINGS

The above and other features of the present invention will be more pronounced through the following detailed description taken in conjunction with the accompanying drawings.

DETAILED DESCRIPTION

Figure 1:
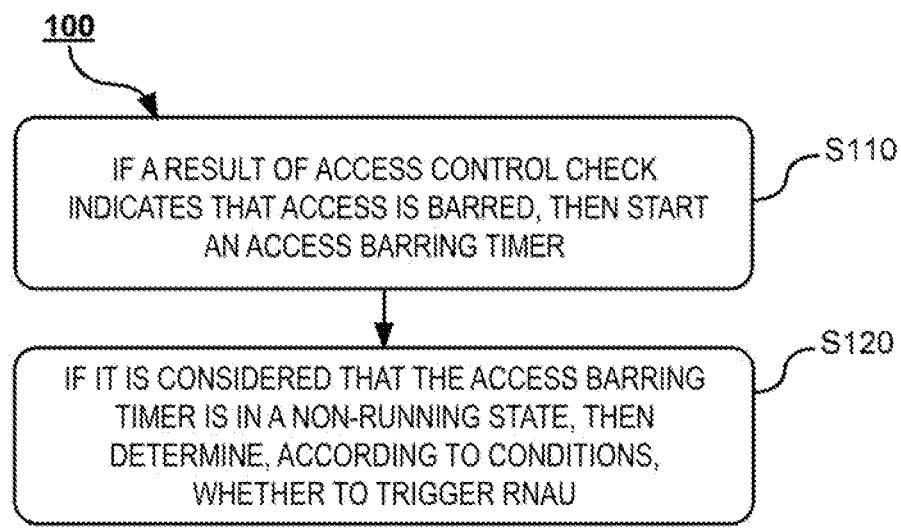
FIG. 1 shows a flowchart of an access control method in user equipment according to an embodiment of the present invention.

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

Prior to the specific description, several terms mentioned in the present invention are illustrated as follows. The terms involved in the present invention shall have the meanings set forth below, unless otherwise indicated.

UE User Equipment. User equipment
NR New Radio New radio technology
LTE Long Term Evolution Long term evolution technology
eLTE Enhanced Long Term Evolution. Enhanced long term evolution technology
NAS Non-access stratum Non-access stratum
AS access stratum Access stratum
EPC Evolved Packet Core Evolved packet core network
EUTRA Evolved-UMTS Terrestrial Radio Access Evolved UMTS terrestrial radio access A plurality of embodiments according to the present invention are specifically described below, with an NR mobile communications system and its subsequent evolved version serving as exemplary application environments, and with a base station and UE that support NR serving as examples. However, it should be noted that the present invention is not limited to the following embodiments, but is applicable to more other wireless communications systems, such as an eLTE communications system, and is applicable to other base stations and UE devices, such as base stations and UE devices supporting eLTE. The Elte communication system refers to that the UE uses an LTE standard (or EUTRA technology) to communicate with a base station on an air interface. However, a non-access stratum of the UE is connected to a 5G core network rather than an EPC.

[Access Control]

In order to perform access control, a triggering layer of an access request provides at least information such as an access category, etc., so as to perform access control check. The triggering layer of the access request may be an access stratum (AS). An access request triggered by the access stratum may be a request for resuming an RRC connection, namely, an RRC connection resumption procedure. During this procedure, the UE transmits an RRC connection resume request message to a network side. The message carries an access cause, and the access cause instructs a cause value for initiation of the connection request.

The AS layer of the UE performs access barring check on the basis of at least the access category information.

There are two types of access barring check results. One result is barring, and the other is not barring/allowed.

Barring refers to that the UE can consider access to the current cell as barred, or refers to that the UE considers setup of a new PDU session in the current cell as barred.

Not-barring refers to that the UE considers access to the current cell as not barred, or refers to that the UE considers setup of a new PDU session in the current cell as not barred.

When the result of the access barring check is barring, the UE can start an access barring timer. This access barring timer can correspond to the access category. Once this access barring timer does not run, then it is indicated that access barring for the corresponding access category thereof is alleviated.

[RAN Notification Area Updating (RNAU)]

In NR/eLTE, UE may be in an inactive state (INACTIVE state). In this state, an RRC connection of the UE is suspended, and a network side can learn a RAN notification area in which the UE is located. The UE side stores information about a valid RAN notification area. When the UE enters/reselects a cell, broadcast system information of the cell includes a RAN notification area to which the cell belongs. If the UE finds that the current cell does not belong to the RAN notification area stored in the UE, or if the RAN notification area to which the current cell belongs is different from the RAN notification area stored in the UE, then the UE needs to notify the network side. In this case, the UE performs RAN notification area updating. The RAN notification area updating specifically includes the following: the UE initiates a resume connection setup request, transmits an RRC connection resume request message to the network side to request to resume the RRC connection, and instructs, in the request message, an identity of the UE in the inactive state. After receiving the RRC connection resume request message, the network side searches for UE information according to the identity of the UE in the inactive state, and updates context of the UE, especially information about the RAN notification area in which the UE is located. The UE also updates the information about the RAN notification area stored therein so as to complete the RNAU procedure.

When entering the INACTIVE, the UE starts a timer. This timer can be referred to as an RNAU timer, and is used to control the UE to periodically perform RNAU. Specifically, when this timer expires, the UE triggers an RNAU procedure. The specific operation is described above. In NR, the name of this timer is T380.

FIG. 1 shows a flowchart of an access control method 100 in User Equipment (UE) according to an embodiment of the present invention. As shown in FIG. 1, the method 100 includes step S110 and step S120.

In step S110, if a result of access control check indicates that access is barred, then UE starts an access barring timer.

In step S120, if it is considered that the access barring timer is in a non-running state, then the UE determines, according to at least one of conditions, whether to trigger RAN Notification Area Updating (RNAU), where the conditions are as follows: whether a current connected state of the UE is an inactive state; whether an RNAU timer started when the UE enters the inactive state is in an running state; and whether a cell in which the UE currently resides belongs to a RAN Notification Area (RNA).

According to the above method 100, RNAU is not triggered as long as the access barring timer is in the non-running state. It is considered, according to the conditions, whether to trigger RNAU, and RNAU is not triggered if the conditions are not met. The conditions may be as follows: whether the current connected state of the UE is the inactive state; whether the RNAU timer started when the UE enters the inactive state is in the running state; and whether the cell in which the UE currently resides belongs to the RAN Notification Area (RNA).

For example, although the access barring timer is in the non-running state, if the current connected state of the UE is not in the inactive state, then RNAU is not triggered, or if the cell in which the UE currently resides belongs to the RNA, then RNAU is not triggered. Therefore, in these cases, meaningless connection requests of RNAU are avoided, thereby improving the utilization efficiency of communication resources.

Several embodiments of the present invention are described in detail below.

Embodiment 1

When a barring timer stops running, it is considered whether UE is in an INACTIVE state.
  If the UE is not in the INACTIVE state, or if the UE is in a connected state, then the UE does not trigger RNAU.
  If the UE is in the INACTIVE state, then it is further considered whether the T380 is in the running state.
    If the T380 is not running, then RNAU is triggered.
    If the T380 is running, then it is further considered whether the cell in which the UE currently resides belongs to the RNA.
      If the cell in which the UE currently resides does not belong to the RNA, then RNAU is triggered.
      If the cell in which the UE currently resides belongs to the RNA, then RNAU is not triggered.

The barring timer refers to a timer related to access barring, and can be construed as a timer started when a result of access check of a certain access category indicates that access is barred. The barring timer stopping running may be that the barring timer expires, or may be that the running barring timer is stopped. In the following cases, the UE can stop the running barring timer.
  Case 1: cell reselection occurs in the UE.
  Case 2: the UE enters the connected state. This case may occur when the UE receives an RRC connection setup (RRCConnectionSetup) message or an RRC connection resume (RRCConnectionResume) message.
  Case 3: the UE enters an idle state, or leaves the INACTIVE state.

Preferably, this barring timer may be a barring timer corresponding to an access category to which the RNAU belongs or corresponds. For example, in order to perform RNAU, the UE initiates access. For such access, the network side pre-defines a specific access category therefor, or the network side broadcasts in the system information an access category to which the access initiated by the UE to perform RNAU belongs, namely an access category to which the RNAU belongs. Each access category has a corresponding barring timer. If a result of access check of the access category indicates that access is barred, then the corresponding barring timer thereof is started.

"RNAU is triggered" disclosed herein may refer to that an RRC connection resume procedure is initialized or initiated, and preferably a cause value/establish cause value carried in an RRC connection resume (RRCConnectionResume) message to be transmitted in this procedure is set to be RNA updating (ma-Update) or information related to RNA updating.

"RNAU is not triggered" disclosed herein may also refer to that the UE does not perform an RRC connection resume procedure related to RNAU.

"The cell in which the UE currently resides" disclosed herein may refer to a cell in which the UE resides when the barring timer is stopped, or a cell that the UE enters, or a cell selected during cell reselection occurring in the UE. Because cell reselection occurs, the barring timer is stopped. The phrase "does not belong to the RNA" may refer to that an RNA to which the cell belongs is different from the RNA information stored/recorded in the UE. Specifically, RNA IDs may be different. The UE can acquire, from the system information broadcast in the cell, the RNA to which the cell belongs or the RNA ID. Alternatively, the cell does not belong to the RNA stored in the UE.

Another implementation of the above procedure may be as follows.
  When the barring timer stops running,
    if the UE is in the INACTIVE state, and if the T380 is not running, then RNAU is triggered;
    if the UE is in the INACTIVE state, and if the cell in which the UE currently resides does not belong to the RNA, then RNAU is triggered.

Still another implementation of the above procedure may be as follows.
  When the barring timer stops running, if the access category corresponding to the barring timer is selected by the RRC, or if the corresponding access category is related to RNAU,
    if the UE is in the INACTIVE state, and if the T380 is not running, then RNAU is triggered;

if the UE is in the INACTIVE state, and if the cell in which the UE currently resides does not belong to the RNA, then RNAU is triggered.

If the access category corresponding to the barring timer is selected by the RRC, then it is implied or indicated that this access is triggered by an RRC layer. Currently, RNAU alone can be an access cause of triggering performed by the RRC layer. Therefore, if the access category corresponding to the barring timer is selected by the RRC, then triggering of the RNAU is considered as described above.

Yet another implementation of the above procedure may be as follows.

When a barring timer corresponding to a certain access category stops running, the UE considers that access barring for the corresponding access category is alleviated. If the access category is related to or corresponds to the RNAU, if the UE is in the INACTIVE state, and if the T380 is not running, then RNAU is triggered;

If the UE is in the INACTIVE state, and if the cell in which the UE currently resides does not belong to the RNA, then RNAU is triggered.

It should be noted that "if" mentioned in this embodiment can be understood as meeting a specific condition. For example, "if the UE is in the INACTIVE state, and if the T380 is not running, then RNAU is triggered" refers to that in a condition in which the UE is in the INACTIVE state and the T380 is not running, the UE triggers RNAU.

Embodiment 2

Embodiment 2 differs from embodiment 1 in that embodiment 2 involves triggering a corresponding operation through an intermediate instruction procedure.

When the barring timer stops running, an instruction is transmitted to the RRC layer, or the UE generates an instruction: access barring for the access category corresponding to the barring timer is alleviated.

On the basis of the instruction or considering the instruction, the RRC layer further performs the following operations.

If the UE is not in the INACTIVE state, or if the UE is in the connected state, then RNAU is not triggered.

If the UE is in the INACTIVE state, then it is further considered whether the T380 is in the running state.

If the T380 is not running, then RNAU is triggered.

If the T380 is running, then it is further considered whether the cell in which the UE currently resides belongs to the RNA.

If the cell in which the UE currently resides does not belong to the RNA, then RNAU is triggered.

If the cell in which the UE currently resides belongs to the RNA, then RNAU is not triggered.

Optionally, on the basis of the instruction, the RRC layer further performs the following operations.

If the UE is in the INACTIVE state, and if the T380 is not running, then RNAU is triggered.

if the UE is in the INACTIVE state, and if the cell in which the UE currently resides does not belong to the RNA, then RNAU is triggered.

Figure 2:
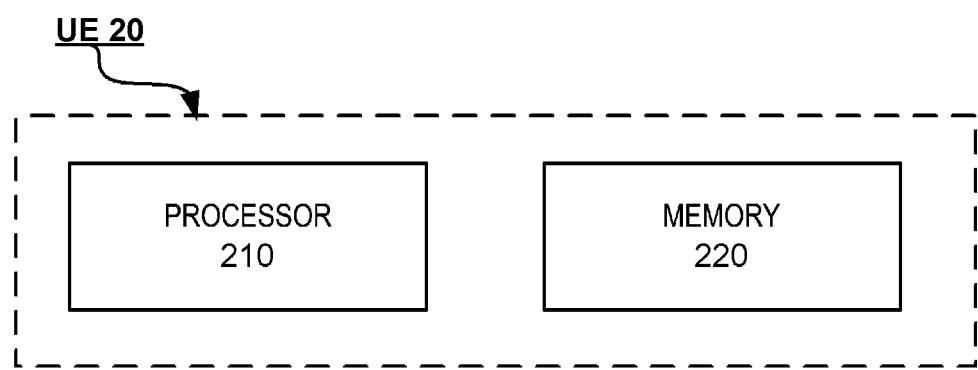
FIG. 2 shows a block diagram of user equipment according to an embodiment of the present invention.

FIG. 2 shows a block diagram of User Equipment (UE) 20 according to an embodiment of the present invention. As shown in FIG. 2, the UE 20 includes a processor 210 and a memory 220. The processor 210 may include, for example, a microprocessor, a microcontroller, an embedded processor, etc. The memory 220 may include, for example, a volatile memory (for example, a Random Access Memory (RAM)), a Hard Disk Drive (HDD), a non-volatile memory (for example, a flash memory), or other memories. Program instructions are stored on the memory 220. The instructions, when run by the processor 210, can perform the aforementioned access control method in the user equipment described in detail in the present invention.

The program running on the device according to the present invention may be a program that enables the computer to implement the functions of the embodiments of the present invention by controlling the Central Processing Unit (CPU). The program or information processed by the program can be stored temporarily in a volatile memory (e.g., Random Access Memory (RAM)), a Hard Disk Drive (HDD), a non-volatile memory (e.g., flash memory), or other memory systems.

The program for implementing the functions of the embodiments of the present invention may be recorded on a computer-readable recording medium. The corresponding functions can be achieved by reading programs recorded on the recording medium and executing these programs by the computer system. The so-called "computer system" may be a computer system embedded in the device, which may include operating systems or hardware (e.g., peripherals). The "computer-readable recording medium" may be a semiconductor recording medium, an optical recording medium, a magnetic recording medium, a short-time dynamic memory program, or any other recording medium readable by a computer.

Various features or functional modules of the device used in the foregoing embodiments may be implemented or executed by circuits (e.g., monolithic or multi-chip integrated circuits). Circuits designed to execute the functions described in this description may include general-purpose processors, Digital Signal Processors (DSPs), Application Specific Integrated Circuits (ASICs), Field Programmable Gate Arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the described embodiments have been described, the present invention is not limited thereto. Fixed or non-mobile electronic devices mounted indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments, and the present invention also includes any design modifications that do not depart from the main idea of the present invention. In addition, various modifications can be made to the present invention within the scope of the claims, and embodiments resulting from the appropriate combination of the technical means disclosed in different embodiments are also included within the technical scope of the present invention. In addition, components with the same effect described in the above embodiments may be replaced with one another.

The invention claimed is:

1. A method performed by a user equipment (UE), comprising:
 performing access barring check for an access category;
 starting an access barring timer for the access category if the UE considers access as barred;
 stopping the access barring timer when cell reselection occurs;
 considering the barring for the access category is alleviated in a case that the access barring timer is stopped; and
 initiating an RRC connection resume procedure when the UE is in RRC INACTIVE state, in a case that the alleviated barring is for the access category which is associated with an RAN Notification Area (RNA).

2. The method according to claim 1, wherein
 within the RRC connection resume procedure, a cause of the RRC connection resume procedure is related to an update of the RNA.

3. A user equipment (UE) comprising:
 a processor; and
 a memory in electronic communication with the processor, wherein instructions stored in the memory are executable to:
 perform access barring check for an access category;
 start an access barring timer for the access category if the UE considers access as barred;
 stop the access barring timer when cell reselection occurs;
 consider the barring for the access category is alleviated in a case that the access barring timer is stopped; and
 initiate an RRC connection resume procedure when the UE is in RRC INACTIVE state, in a case that the alleviated barring is for the access category which is associated with an RAN Notification Area (RNA).

4. The UE of claim 3, wherein
 within the RRC connection resume procedure, a cause of the RRC connection resume procedure is related to an update of the RNA.

* * * * *